(No Model.)
W. G. CROOM.
DOMESTIC OVEN.
No. 323,280. Patented July 28, 1885.
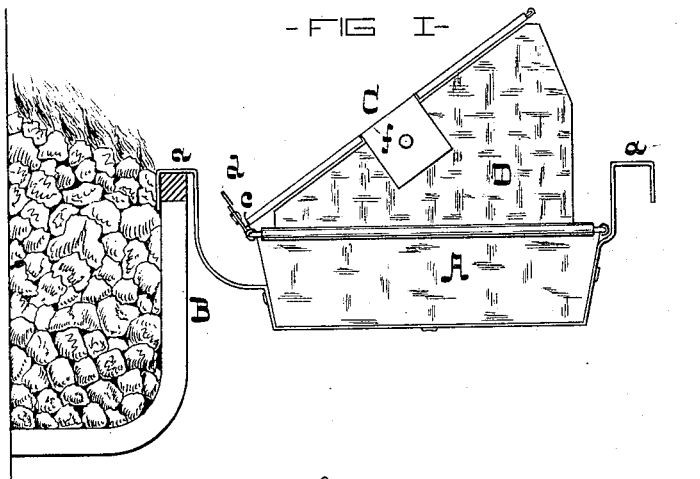
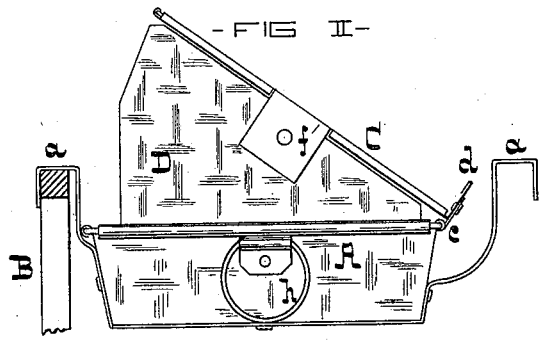
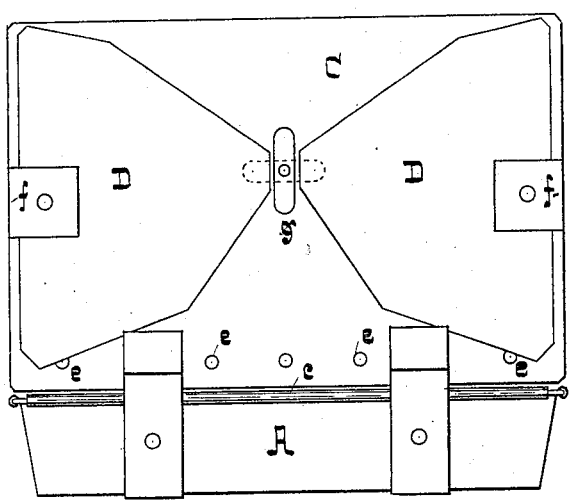
WITNESSES
Danl Fisher
E. H. Frey
INVENTOR
Wiley G. Croom,
by G. H. & W. T. Howard,
attys.

UNITED STATES PATENT OFFICE.

WILEY G. CROOM, OF VICKSBURG, MISSISSIPPI.

DOMESTIC OVEN.

SPECIFICATION forming part of Letters Patent No. 323,280, dated July 28, 1885.

Application filed February 28, 1885. (No model.)

*To all whom it may concern:*

Be it known that I, WILEY G. CROOM, of the city of Vicksburg, and State of Mississippi, have invented certain Improvements in Cooking Utensils, of which the following is a specification.

This invention relates to an improved utensil adapted to be hooked to or otherwise supported by the bars of an open grate or the grate of a stove or range in which rolls can be baked, bread toasted, and a variety of other cooking operations performed.

In the further description of the invention which follows reference is made to the accompanying drawings, forming a part thereof, and in which—

Figure I is an end view of the invention, showing the same applied to a grate. Fig. II is a similar view, except that the position of the utensil is reversed. Fig. III is a side view of the invention without the grate, and illustrates how certain parts of the same may be folded when the invention is not in use.

A is a shallow pan having hooks $a$, whereby either side thereof may be connected to the grate, which is represented by B.

C is a plate made of some heat-reflecting material, such as tinned iron, hinged at $c$ to one edge of the pan A. When the utensil is applied to the grate, as shown in Fig. I, the outside of the plate C receives heat radiated from the fire, and bread may be toasted thereon, and to prevent the bread from sliding off the plate the same is fitted with a lip, $d$, against which the lower edge of the bread rests. The utensil may also be used while in this position for broiling steak and chops, and for this purpose it is furnished with the holes $e$, through which gravy passes to the interior of the pan A.

The plate C is supported in an inclined position by means of the wings D. The wings D have heat-reflecting inner surfaces, and are hinged to the ends of the plate C at $f$.

When the invention is to be used as a baker, the articles to be cooked are placed in the pan, which is hooked to the grate, as shown in Fig. II. When in this position heat from the fire is deflected by the bright under surface of the plate C and the inner faces of the wings D upon the contents of the pan, and the baking operation is rapidly accomplished.

When the invention is not in use, the wings D are folded to the inner side of the plate C, and held thereat by means of a button, $g$, shown only in Fig. III.

The device is provided with a suspension-ring, $h$.

I claim as my invention—

1. The pan A, having the hinged heat-reflecting plate C and suitable supports therefor, substantially as specified.

2. The pan A, having the heat-reflecting plate C and wings D, combined with the hooks, whereby the same may be attached to a grate, substantially as specified.

3. The pan A, having the heat-reflecting plate C, combined with the wings D, hinged to the plate C, whereby they may be folded to the face of the said plate and secured thereat, substantially as specified.

W. G. CROOM.

Witnesses:
JNO. MCQUAIDE,
ROBT. K. YOUNGBLOOD.